(12) United States Patent
Koyama et al.

(10) Patent No.: US 7,316,448 B2
(45) Date of Patent: Jan. 8, 2008

(54) COWL TOP COVER

(75) Inventors: Motomu Koyama, Fuji (JP); Naoto Onuma, Fuji (JP); Akihiro Ishikawa, Fuji (JP); Kazuhiro Sakai, Fuji (JP)

(73) Assignee: Nihon Plast Co., Ltd., Shizuoka (JP)

( * ) Notice: Subject to any disclaimer, the term of this patent is extended or adjusted under 35 U.S.C. 154(b) by 39 days.

(21) Appl. No.: 11/188,795

(22) Filed: Jul. 26, 2005

(65) Prior Publication Data

US 2006/0087155 A1    Apr. 27, 2006

(30) Foreign Application Priority Data

Jul. 27, 2004 (JP) ............................. 2004-218666

(51) Int. Cl.
*B62D 25/08* (2006.01)

(52) U.S. Cl. ..................................... 296/192

(58) Field of Classification Search ................ 296/192
See application file for complete search history.

(56) References Cited

U.S. PATENT DOCUMENTS 6,565,148 B1    5/2003 Teramoto et al.

2003/0107243 A1    6/2003 Hayashi

FOREIGN PATENT DOCUMENTS

| JP | 7-285319 A | 10/1995 |
| JP | 10-218029 A | 8/1998 |
| JP | 10-226286 A | 8/1998 |
| JP | 11-16564 A | 6/1999 |
| JP | 2005289237 A | * 10/2005 |
| JP | 2006264538 A | * 10/2006 |

* cited by examiner

*Primary Examiner*—Dennis H Pedder
*Assistant Examiner*—Melissa A Black
(74) *Attorney, Agent, or Firm*—Sughrue Mion Pllc.

(57) ABSTRACT

A cowl top cover for an automotive vehicle having a body panel with a support plate and for defining an engine room, a hood covering the engine room, and a cowl portion arranged behind the engine room, wherein the cowl top cover includes a base having a mounting portion, a first wall extending from the base to the hood and supporting a sealing member abutting on the hood, and a second wall extending from the base and covering the cowl portion, wherein the base is supported by the support plate at the mounting portion and exposed to the engine room, and the mounting portion is covered with a covering portion.

10 Claims, 6 Drawing Sheets

COWL TOP COVER

BACKGROUND OF THE INVENTION

The present invention relates to a cowl top cover arranged between a front glass and a hood of an automotive vehicle, for example.

Typically, a cowl top cover is arranged between a front glass and a hood of an automotive vehicle to serve to cover a space between a front end of the front glass and a rear end of the hood. Specifically, the cowl top cover covers an air box arranged between a vehicle-body panel at a rear end of an engine room and a cowl top panel for supporting the front glass, enhancing the appearance. The cowl top cover is formed with an air intake communicating with the air box for introducing outside air into a vehicle cabin. Further, a sealing member is mounted at a front end of the cowl top cover to hermetically close a space between the vehicle-body panel and the hood, thus preventing heat and odor in the engine room from intruding into the air box.

As is disclosed in Japanese document JP-A 7-285319, in the constitution in which a distal end of a main-body portion of the vehicle body is arranged below and close to the hood, for example, a plurality of pawls are arranged to integrally project from a distal end of a cowl louver disposed between the hood and the main-body portion of the vehicle body. The pawls are inserted into and engaged with a plurality of mounting holes formed in the main-body portion of the vehicle body, and a hood seal abutting on a lower surface of the hood is mounted on a distal end of the cowl louver. In this constitution, a holding member of the hood seal is held between an end of the cowl louver and main-body portion of the vehicle body.

SUMMARY OF THE INVENTION

In the related-art constitution, the pawls and mounting holes are provided at corresponding positions. Typically, in view of the accuracy of parts, assembling tolerance, mounting workability, and the like, the mounting holes are formed larger than the pawls to be inserted therein. Accordingly, there arises a problem that odor and hot air in the engine room tend to enter the air box through slight clearances between the mounting holes and pawls, then intruding into the cabin.

Cowl top covers of various shapes are used to achieve energy absorption upon vehicle collision. However, in the related art, the cowl louver and the main-body portion of the vehicle body should be connected at the distal end of the cowl louver, leading to a problem of restricted shapes of the cowl top covers.

It is, therefore, an object of the present invention to provide a cowl top cover which can be mounted to a vehicle-body panel in a close contact way with simple constitution.

Generally, the present invention provides a cowl top cover for an automotive vehicle having a body panel with a support plate, the body panel defining an engine room, a hood covering the engine room, and a cowl portion arranged behind the engine room, wherein the cowl top cover comprises: a base having a mounting portion; a first wall extending from the base to the hood, the first wall supporting a sealing member abutting on the hood; and a second wall extending from the base and covering the cowl portion, wherein the base is supported by the support plate at the mounting portion and exposed to the engine room, and wherein the mounting portion is covered with a covering portion.

BRIEF DESCRIPTION OF THE DRAWING

The other objects and features will become apparent from the following description with reference to the accompanying drawings, wherein.

DETAILED DESCRIPTION OF THE INVENTION

The embodiments of a cowl top cover according to the present invention will be described hereafter with reference to the drawings.

Figure 1:
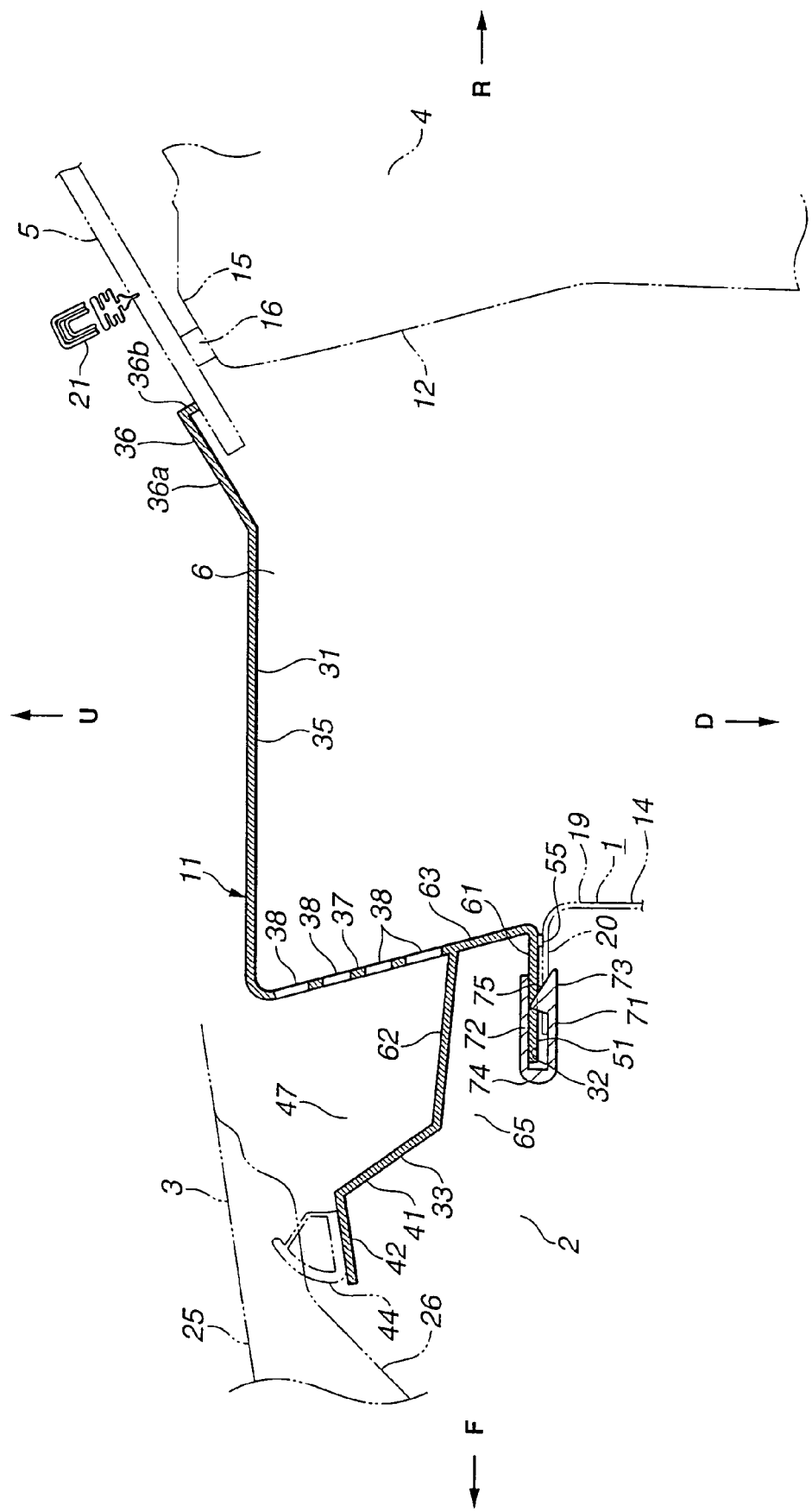
FIG. 1 is a sectional view taken along the line I-I in FIG. 3, showing an embodiment of a cowl top cover according to the present invention in the state of being mounted on an automotive vehicle.
Figure 2:
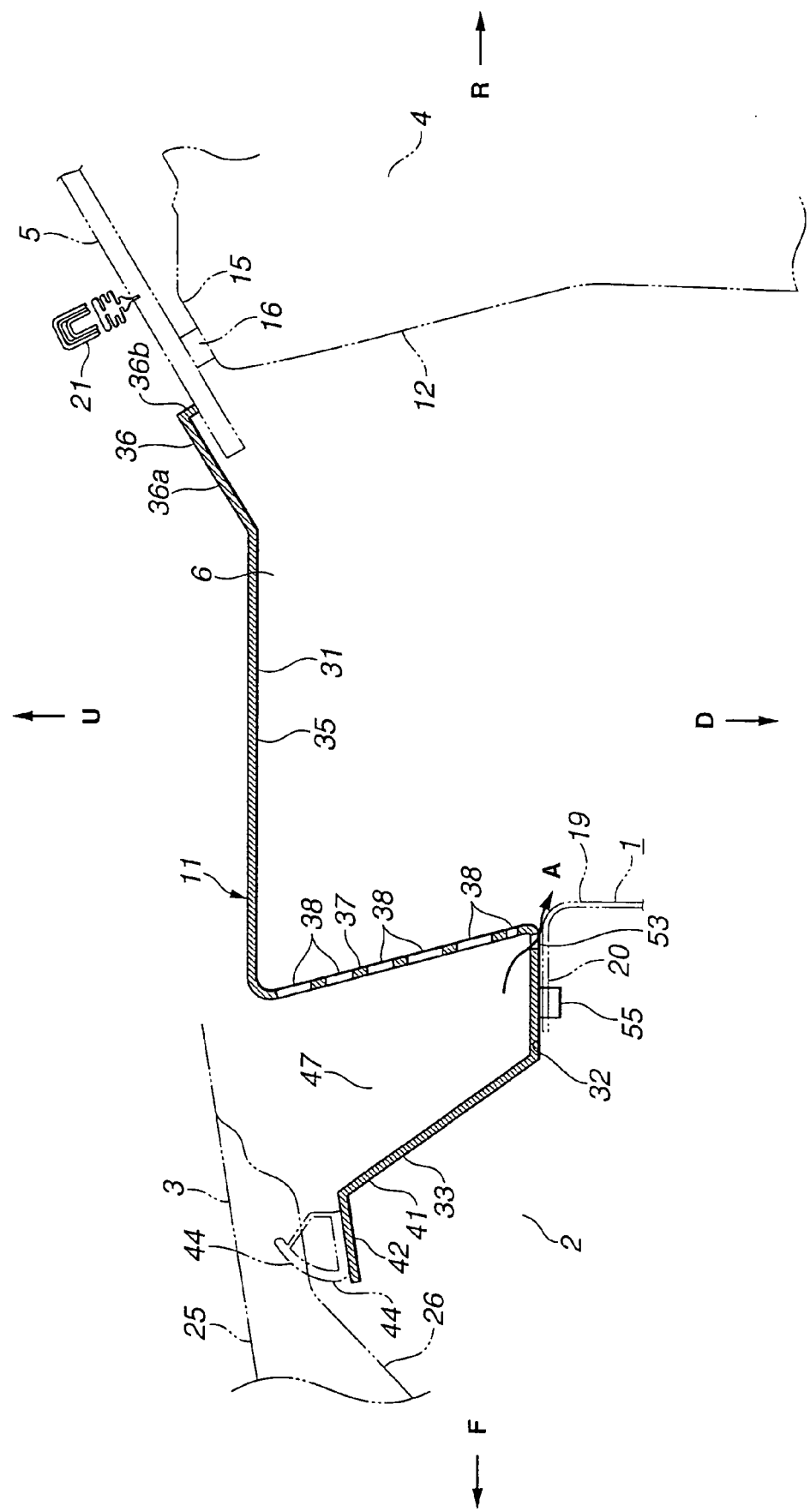
FIG. 2 is a view similar to FIG. 1, taken along the line II-II in FIG. 3.

Referring to FIGS. 1 and 2, an automotive vehicle comprises a vehicle body 1 and a cowl top cover 11 thereto. The cowl top cover 11 covers a cowl portion 6 arranged between a hood 3 serving as a counter member for covering an engine room 2 and a front glass 5 serving as a wind shield positioned at the front of a vehicle cabin 4. It is noted that the directions such as forward direction indicated by an arrow F, rearward direction indicated by an arrow R, upward direction indicated by an arrow U, downward direction indicated by an arrow D, and rightward/leftward direction indicated by an arrow W will be described hereafter with the straight-ahead direction of the vehicle body 1 as reference.

The cowl portion 6 is also referred to as an air box, and is shaped like a trough having an opened upper side by a cowl top panel 12 formed, for example, of a steel plate and a vehicle-body panel 14 formed, for example of a steel plate and for constituting a vehicle body. A front-glass receiver 15 is formed on an upper side of the cowl top panel 12 to which the front glass 5 is fixed by a seal material 16 such as a rubber-based adhesive agent such as a hotmelt which provides liquid-tight sealing. The vehicle-body panel 14 is also referred to as an extension panel, and has a rear portion forming a bottom plate, not shown, fixed to the cowl top panel 12. The vehicle-body panel 14 includes a front plate 19 obtained by upwardly inclinedly raising a front portion of the bottom plate and a support plate 20 serving as a stationary receiver and obtained by extending an upper end of the front plate 19 forwardly and roughly horizontally. A motor for driving wiper arms of a wiper 21 and the like are arranged in the cowl portion 6, and an air intake of an air conditioner, not shown, for introducing outside air into the cabin 4 is connected thereto.

The hood 3 comprises a hood outer portion 25 positioned outside or above in the closed state and a hood inner portion 26 positioned inside or below the hood outer portion 25 with a slight clearance in the closed state. The hood outer portion 25 and the hood inner portion 26 are formed integrally or separately.

The cowl top cover 11 is also referred to as a cowl cover, and serves to cover a space between the front glass 5 and a rear end of the engine room 2 positioned in the forward direction F of the front glass 5. The cowl top cover 11 is formed by injection molding of thermoplastic resin such as polypropylene (PP), acrylonitrile-butadiene-styrene copolymer (ABS), or polyamide synthetic resin using molds. Referring to FIGS. 1-4, the cowl top cover 11 is shaped like a roughly elongated plate as a whole, having the rightward/leftward direction W of the vehicle body 1 along the cowl portion 6 or the vehicle-width direction as longitudinal direction so as to cover the cowl portion 6 or the upper sides of the cowl top panel 12 and vehicle-body panel 14 and thus enhance the appearance. When viewed in the sectional shape, the cowl top cover 11 comprises a cover main body 31 serving as a second wall and for mainly covering the cowl portion 6, a base portion 32 continuously connected to a front end of the cover main body 31 and supported on the support plate 20, and a cover front portion 33 serving as a first wall and extending forwardly upwardly from the base portion 32, wherein the cover main body 31, base portion 32, and cover front portion 33 are formed integrally.

Figure 3:
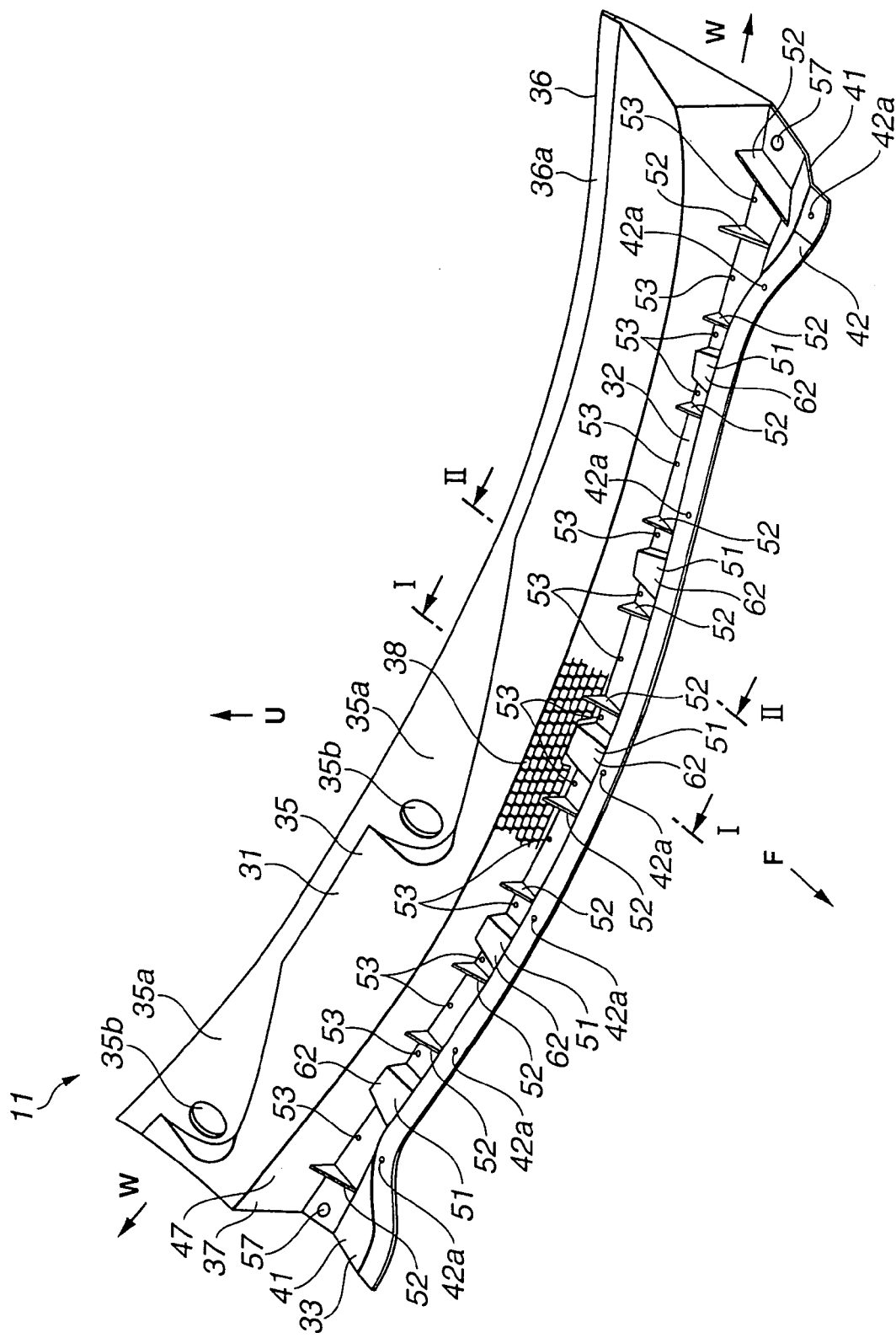
FIG. 3 is a perspective view, partly omitted, showing the cowl top cover.

The cover main body 31 is also referred to as a covering portion, and comprises a roughly horizontal upper wall 35, a rear mounting portion 36 arranged at a rear end of the upper wall 35, and a rear wall 37 extending downwardly from a front end of the upper wall 35 and continuously connected to the base portion 32. The upper wall 35 covers an upper side of the space of the cowl portion 6, and is formed with a recess 35*a* and holes 35*b* in accordance with the shape of the wiper 21 as shown in FIG. 3. The rear mounting portion 36 includes an inclined surface 36*a* inclinedly formed along the front glass 5 and a glass abutment 36*b* obtained by bending the inclined surface 36*a* and abutting on the front glass 5 as shown in FIGS. 1 and 2. The rear mounting portion 36 may be shaped like a clip or the like engagedly lo mounted to the front glass 5. On the other hand, the rear wall 37 extends downwardly from the front end of the upper wall 35 and inclines slightly rearwardly. An air intake 38 allowing introduction of outside air into the cowl portion 6 is formed in the rear wall 37 over the overall length in the longitudinal direction or the rightward/leftward direction W. The air intake 38 is shaped like a grid having bars arranged at intervals of 7 mm and 5 mm in the longitudinal and lateral directions, respectively. Outside air taken into the cowl portion 6 through the air intake 38 is fed to the cabin 4 by an air conditioner.

The cover front portion 33 is arranged below or on the reverse side of the hood 3, and comprises a plate-shaped front wall 41 inclining forwardly upwardly and a roughly horizontal-plate-shaped seal receiver 42 extending forwardly from a front end or a distal or upper end of the front wall 41. A cowl top seal 44 serving as a resiliently deformable sealing member is arranged on the seal receiver 42, and is fixed thereto by a separate and distinct clip or an adhesive agent as fixing means using a seal mounting hole 42*a* formed in the seal receiver 42. The cowl top seal 44 is shaped like a cylinder made, for example, of rubber or thermoplastic elastomer to make contact with the closed hood 3 in a liquid-tight way, thus blocking the entry of hot air and odor from the engine room 2. The front wall 41 and the seal receiver 42 are connected together by plate-shaped ribs 45 for reinforcement as shown in FIG. 4.

Referring to FIG. 2, the base portion 32 is shaped like a roughly horizontal plate disposed on the support plate 20. A trough 47 having an opened upper side is defined by the base portion 32, front wall 41, and rear wall 37. As shown in FIGS. 1 and 3, roughly box-shaped mounting portions 51 are integrally formed with the base portion 32 at given intervals. Further, integrally formed with the base portion 32 at the positions having no mounting portions 51 are plate-shaped reinforcing ribs 52 of triangular shape or the like for connecting the base portion 32, front wall 41, and rear wall portion 37 to, for example, a top plate forming a lower portion of the rear wall 37 and the front wall 41 as will be described later. Circular drain holes 53 are formed between the mounting portion 51 and the rib 52 and between the adjacent ribs 52 and at the positions close to the corner of the rear end of the base portion 32. A sealing body 55 is mounted on the lower side of the base portion 32 in front of the holes 53 by adhesion or the like over a substantially overall length along the longitudinal direction. Further, circular mounting holes 57 for fixing the base portion 32 to the vehicle-body panel 14 and the like using a fixture such as a columnar clip, not shown, are formed on both ends of the base portion 32 in the rightward/leftward direction W and at the positions failing to face the engine room 2.

The mounting portions 51 are each shaped like a box which opens into the front side or the engine room 2, and are arranged roughly equidistantly in the longitudinal direction of the cowl top cover 11 or the vehicle-width direction. Each mounting portion 51 comprises a roughly horizontal base plate 61, an upper plate 62 facing an upper side of the base plate 61, a rear plate 63 for connecting the both-sides rear ends of the base plate 61 and upper plate 62, and side plates 64, wherein the front side includes an opening 65. The base plate 61 is formed flush with the base portion 32, and is disposed on the support plate 20 through the sealing body 55 in a close contact way. Specifically, the mounting portion 51 is shaped like roughly a letter U in section, which opens into the front wall 41, wherein the base plate 61 has an upper side covered with other parts of the mounting portion 51 and the front wall 41 of the cover front portion 33. Further, the mounting portion 51 has a shape expanding toward the opening 65 as a whole. Specifically, the upper plate 62 is formed gradually away from the rear plate 63 to the opening 65, and the side plates 64 are also formed gradually away from the rear plate 63 to the opening 65. Then, with the base plate 61 arranged roughly horizontally, the upper plate 62 is arranged to form an inclined surface which lowers to the rear side.

Figure 4:
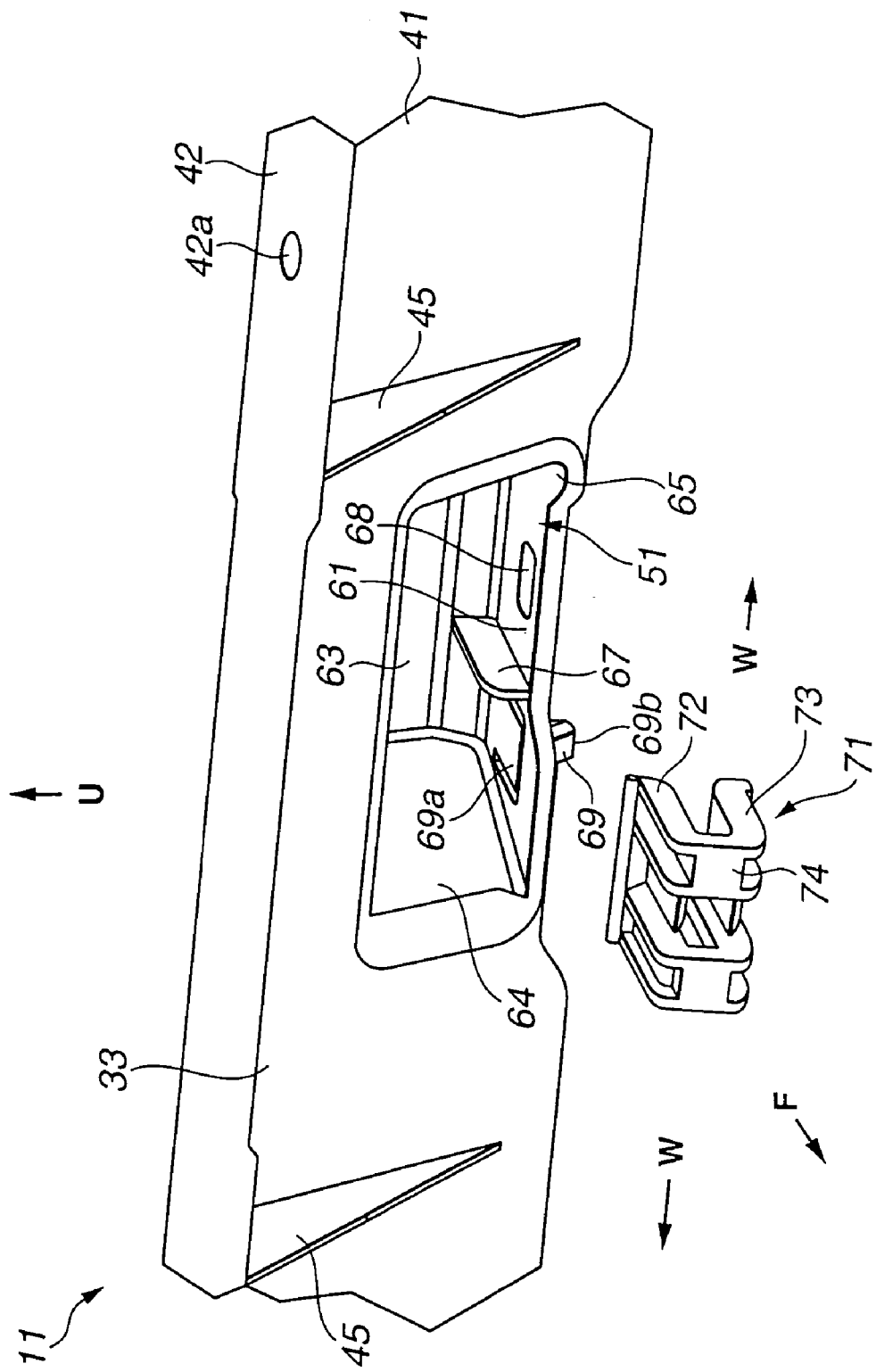
FIG. 4 is a fragmentary exploded perspective view showing the cowl top cover.

As shown in FIG. 4, the base plate 61 has a clip guide rib 67 serving as guide means arranged thereon to project upwardly longitudinally from the roughly center portion in the rightward/leftward direction W. The base plate 61 also has a clip receiver 68 serving as an engagement receiver formed therewith to be positioned on one side of the clip guide rib 67, and a center location pin 69 serving as positioning means formed therewith to be positioned on another side of the clip guide rib 67. The clip receiver 68 is shaped like a rectangular hole vertically arranged through the base plate 61. The center location pin 69 comprises a resiliently deformable pin base portion 69*a* shaped like a tongue flush with the base plate 61 and a pin portion 69*b* arranged to project downwardly from the pin base portion 69*a*.

With being superimposed on the support plate 20, the mounting portion 51 is fixed to the support plate 20 of the vehicle-body panel 14 by a clip 71 serving as a fixture. The clip 71 is formed resiliently deformably of resin or the like to be separate and distinct from the mounting portion 51. As shown in FIGS. 1 and 4, the clip 71 comprises a cover facing portion 72 abutting on the upper face of the base plate 61 of the mounting portion 51, a panel facing portion 73 facing the lower side of the support plate 20, and a connecting portion 74 for connecting the cover facing portion 72 and the panel facing portion 73. The clip 71 is shaped like a letter U as viewed from the rightward/leftward direction W. Further, an engagement 75 is formed on the panel facing portion 73 to project upwardly as shown in FIG. 1.

Facing the clip receiver 68, another clip receiver, not shown, of the same shape as that of the clip receiver 68 is formed with the support plate 20 of the vehicle-body panel 14 at the position where the base plate 61 of the mounting portion 51 is superimposed. Further, a location-pin receiver serving as rectangular-hole-shaped positioning means, not shown, is formed with the support plate 20 to face the center location pin 69.

Work for mounting the cowl top cover 11 to the vehicle body 1 is performed such that the base portion 32 of the cowl top cover 11 and the base plate 61 of the mounting portion 51 are superimposed on the support plate 20 of the vehicle-body panel 14, to which the clip 71 is mounted from the front side or the side of the engine room 2. Specifically, with the base plate 61 superimposed on the support plate 20, the center location pin 69 is inserted into the location pin receiver to position the cowl top cover 11 to the vehicle-body panel 14. In this state, using the clip guide rib 67 as a guide, the clip 71 is press fitted into one side of the clip guide rib 67 in such a way as to hold the support plate 20 and the base plate 61. Then, the engaging portion 75 of the clip 71 engages with the support plate 20 and the clip receiver 68 of the base plate portion 61, preventing disengagement of the clip 71. The clip 71 brings the support plate 20 and the base plate 61 into close contact through the compressed sealing body 55 to hermetically mount the cowl top cover 11 to the vehicle-body panel 14 or hermetically maintain the engine room 2 and the cowl portion 6. Both ends of the cowl top cover 11 are fixed by a clip, not shown, vertically arranged therethrough at the position failing to face the engine room 2. With the hood 3 closed, the cowl top seal 44 abuts on the lower side of the hood 3 to be compressed, thus covering the rear side of the engine room 2 roughly hermetically with the trough 47.

Under service conditions of the automotive vehicle, outside air is introduced into the cowl portion 6 from the trough 47 of the cowl top cover 11 through the air intake 38, then fed to the cabin 4 from the cowl portion 6 by the air conditioner.

On the other hand, liquid such as rainwater which has intruded into the trough 47 of the cowl top cover 11 is discharged to the cowl portion 6 from the holes 53 arranged close to the corner of the rear end of the base portion 32 as indicated by an arrow A in FIG. 2. Further, liquid on the mounting portions 51 is collected to the rear side by the inclined upper plate 62, and smoothly guided on the base portion 32 after flowing in the rightward/leftward direction W, then discharged from the holes 53.

In this way, according to the embodiment, the support plate 20 of the vehicle-body panel 14 and the base plate 61 of the mounting portion 51 of the cowl top cover 11, which project in the forward direction F or to the engine room 2 and are covered with the cover front portion 33 and part of the mounting portion 51 at the upward position U, are held and fixed by the clip 71 from the front side, thus allowing easy and hermetic fixing of the vehicle-body panel 14 and the cowl top cover 11. Specifically, since the base plate 61 is covered with the cover front portion 33 and the box-shaped mounting portion 51 at the upward position U, odor and hot air coming from below D are guided in the forward direction F, thus allowing prevention of odor and hot air from advancing toward the cowl portion 6. In this way, odor and hot air in the engine room 2 can be restrained from intruding into the cowl portion 6 and further to the cabin 4 directly or indirectly from the air intake 38 through the mounting portion 51 serving as a fixing portion of the cowl top cover 11, resulting in enhancement in quality of the vehicle. Further, it becomes unnecessary to use an expensive sealing member and the like, resulting in easy reduction in manufacturing cost.

Since odor and hot air in the engine room 2 can be interrupted by the mounting portion 51, the mounting portion 51 and the air intake 38 can be arranged adjacent to each other. This allows enhancement in flexibility of their shape, resulting in easy enhancement in performance, impact absorbing characteristics, or appearance of the air conditioner.

Further, the mounting portion 51 can be arranged more rearwardly R than the cowl top seal 44 for ensuring sealing between the hood 3 and the cowl top cover 11, resulting in easy achievement of adjustment of the impact absorbing characteristics.

Still further, the clip 71 is shaped like roughly a letter U in section to provide the constitution which allows mounting of the clip 71 by work from the front side, allowing a reduction in required work space above and below the support plate 20 and the base plate 61, resulting in thin formation of the mounting portion 51. Moreover, the base plate 61 of the mounting portion 51 and the clip 71 are invisible in the portion exposed to the outside, resulting in easy enhancement in appearance. Moreover, the support plate 20 and the clip receiver 68 of the base plate 61 are covered with the clip 71, resulting in enhancement in hermeticity.

Furthermore, the mounting portion 51 is formed like a roughly box of rectangular parallelepiped having upper and lower faces, side faces, and a rear face partitioned, and a front side F opened. Thus, due to reinforcing effect of the mounting portion 51, the rigidity of the cowl top cover 11 in its entirety can be enhanced, resulting in facilitation of its handling during mounting to the vehicle body 1. Moreover, the impact absorbing characteristics can be adjusted easily by merely changing the size and thickness of the plate of each part of the box or arrangement of the mounting portions 51, resulting in easy achievement of the structure directed to impact alleviation of a pedestrian upon collision. Moreover, due to enhancement in rigidity resulting from the mounting portion 51, other reinforcing structures such as ribs 52 on the surface side can be reduced or cancelled.

Further, the reinforcing ribs 52 are arranged in the portions other than those having box-shaped mounting portions 51. Thus, due to reinforcing effect of the ribs 52, the rigidity of the cowl top cover 11 in it entirety can be enhanced, resulting in facilitation of its handling during mounting to the vehicle body 1. Moreover, a secondary impact resulting from collision with a pedestrian can effectively be absorbed by breaking or deforming the ribs 52 when undergoing an impact, resulting in easy achievement of a reduction in damage value.

Still further, the box-shaped mounting portion 51 is formed to expand toward the opening 65 as a whole, and has upper face inclined gradually upwardly from the rear side to the front side with respect to the lower face. Thus, when forming the cowl top cover 11, a mold for the box-shaped mounting portion 51 can be removed easily, resulting in a reduction in manufacturing cost. Moreover, the inclined upper plate 62 functions as a trough for discharging rainwater which has flowed into the upper face of the mounting portion 51, resulting in prevention of water from intruding into the engine room 2 and smooth drainage thereof from the drain holes 53 to the rear cowl portion 6. Moreover, the sealing body 55 is arranged between the cowl top cover 11 and the vehicle-body panel 14, allowing sure prevention of odor and hot air in the engine room 2 from intruding into the cowl portion 6 through the holes 53.

In the embodiment, a fracture portion which is more fragile and fracturable than the other portions may be arranged at any position in the cowl top cover 11 to adjust the impact absorption characteristics when undergoing an impact. Specifically, the mounting portion 51 is shaped like a quasi box which connects the front wall 41 and the rear wall 37 and bulges upwardly, and the base plate 61 of the mounting portion 51 is superimposed on the support plate 20 of the vehicle-body panel 14, which is fixed by the clip 71. Thus, when arranging the mounting portions 51 at given intervals, the strength or rigidity of the cowl top cover 11 increases, leading to possible increase in reaction force against an impact. Then, when a colliding object such as a pedestrian is jumped up by collision with an automotive vehicle, and further collides the hood 3, an impact is transmitted from the cowl top seal 44 to the front wall 41 of the cover front portion 33. However, the impact against the collision part can surely be alleviated by rupturing the fracture portion provided to one or both of the front wall 41 of the cover front portion 33 and the mounting portion 51.

Figure 5:
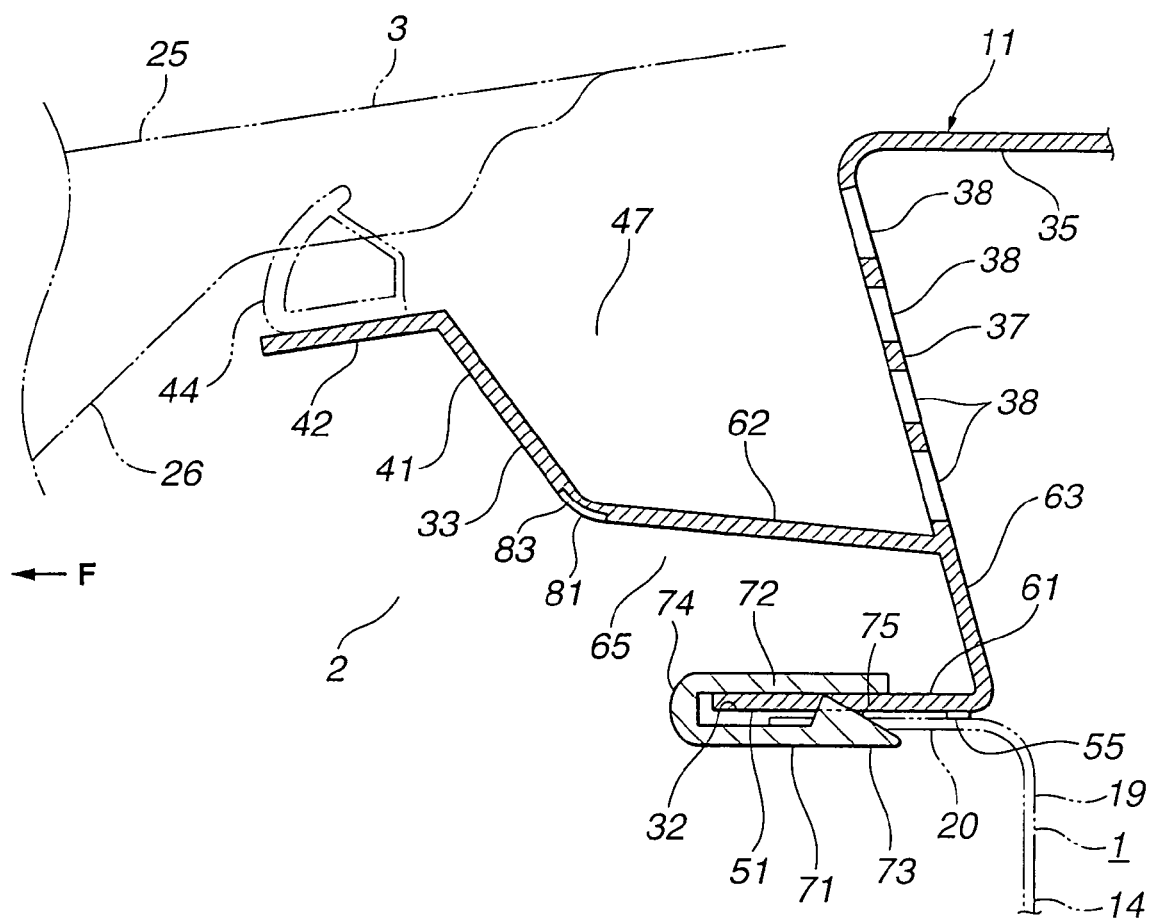
FIG. 5 is a view similar to FIG. 2, showing another embodiment of a cowl top cover according to the present invention in the state of being mounted on an automotive vehicle.
Figure 6:
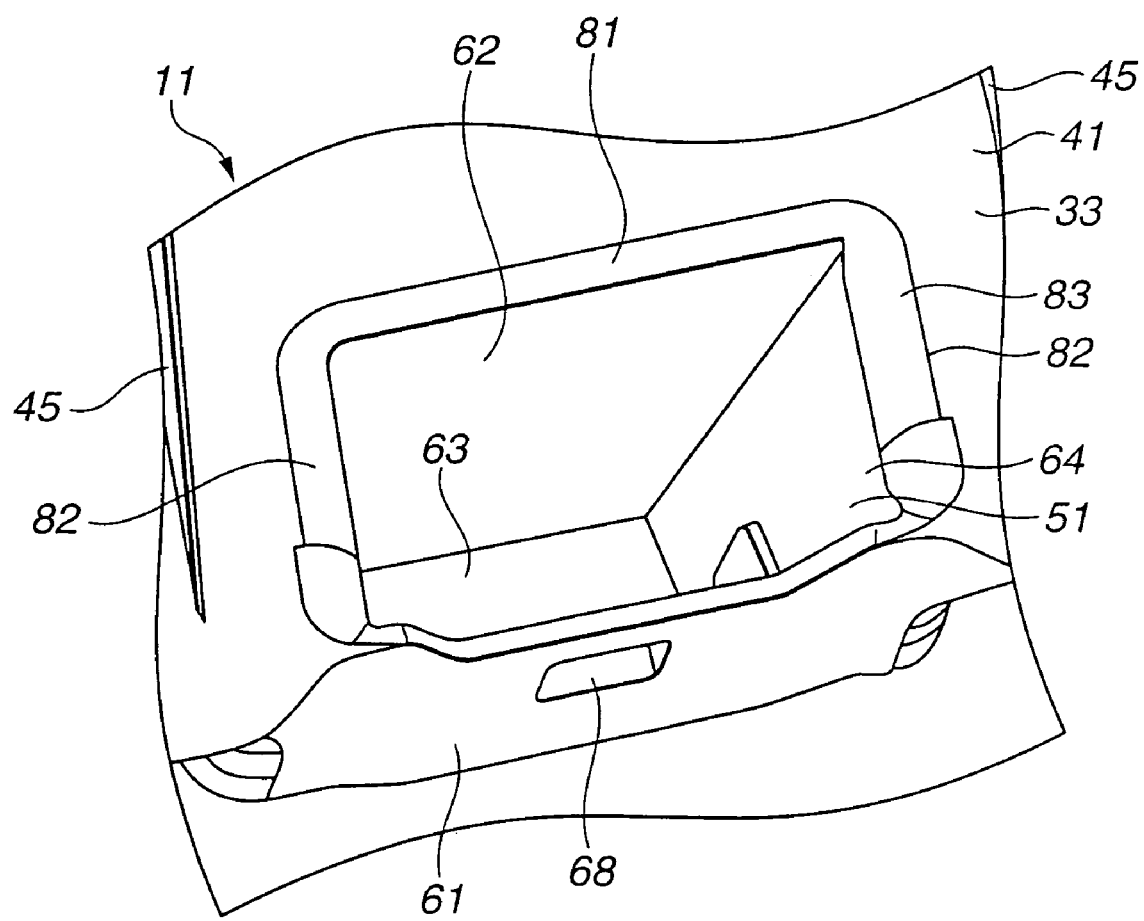
FIG. 6 is a fragmentary perspective view showing the cowl top cover shown in FIG. 5.

Referring to FIGS. 5 and 6, by way of example, a small groove-shaped fracture portion 83 of smaller thickness than the adjacent portions can be arranged by recessing the mounting portion 51 from the side of the engine room 2 along an upper edge 81 which is an edge on the impact applied side of the box-shaped mounting portion 51, i.e. side opposite to the vehicle-body panel 14 of the vehicle body 1, and side edges 82. With such constitution, when an impact due to collision with the colliding object such as a pedestrian is applied to the hood 3, then transmitted to the front wall portion 41 of the cover front portion 33, a force is concentratedly applied to the fracture portion 83 arranged along the edges 81, 82 of the mounting portion 51 having larger rigidity than the other portions, achieving immediate rupture of the fracture portion 83. In this way, an impact to be applied to the colliding object can surely be alleviated by the constitution of the front portion of the cowl top cover 11 only without being influenced by the vehicle body 1.

Optionally, instead of arranging the fracture portion 83 along the upper edge 81 and side edges 82 of the box-shaped mounting portion 51 as described above, a groove-shaped fracture portion of smaller thickness than the adjacent portions may be arranged in the upper plate 62 and side plate 64 of the box-shaped mounting portion 51. Alternatively, a groove-shaped fracture portion may be arranged in the front wall 41, rear wall 37, base plate 61, and the like which are walls around the upper plate 62, side plate 64, and rear plate 61 of the mounting portion 51 in such a way as to surround the mounting portion 51. Specifically, the fracture portion may be arranged at a suitable position to lower the rigidity of the box-shaped portion by breaking connection between the mounting portion 51 which is a box-like portion and the front wall 41 and rear wall 37 which is a wall around the box-like portion.

In the above embodiments, the fixture is not limited to the U-shaped clip 71, and may be a clip for vertically clamping the support plate 20 and the base plate 61 when arranged through the two.

Further, the cover main body 31 of the cowl top cover 11 may be of the suitable shape.

As described above, according to the present invention, the mounting portion having fixture mounted thereto is covered with the first wall, and is exposed to the engine room. Then, even if a through hole or the like is formed in the mounting portion, odor and hot air in the engine room is restrained from intruding into the cowl portion through the mounting portion. Moreover, the mounting portion and the fixture are invisible in the portion exposed to the outside, resulting in enhancement in appearance. The mounting portion can be mounted at the position apart from the sealing member, resulting in enhancement in flexibility of the shape.

Further, according to the present invention, with the support plate provided to the vehicle-body panel and the base plate of the mounting portion of the cowl top cover superimposed one upon another, they are held and fixed by the fixture, resulting in easy fixing of the vehicle-body panel and the cowl top cover in a close contact way. Since the mounting portion is shaped like a box, the rigidity of the cowl top cover can easily be enhanced, resulting in facilitation of handling of the top cowl cover during work. Moreover, adjustment of the impact absorbing characteristics based on deformation or rupture of the cowl top cover can easily be performed through adjustment or the like of the dimension of the mounting portion.

Still further, according to the present invention, odor and hot air in the engine room is restrained from intruding into the cabin through the mounting portion of the cowl top cover, resulting in facilitation of arrangement of an air intake in the second wall close to the mounting portion.

Furthermore, according to the present invention, adjustment of the impact absorbing characteristics based on deformation or rupture of the cowl top cover can easily be performed through adjustment of the dimension and position of the ribs.

Further, according to the present invention, when forming the cowl top cover using molds, the mold corresponding to the mounting portion can be removed easily, resulting in a reduction in manufacturing cost. Moreover, rainwater or the like which has flowed into the mounting portion is guided by the inclined upper plate, allowing smooth drainage.

Still further, according to the present invention, when an impact due to collision with a colliding object such as a pedestrian is applied to the hood, then transmitted to the first wall, the fracture portion provided to at least one of the first wall and the mounting portion is ruptured, resulting in sure alleviation of an impact to be applied to the colliding object.

Furthermore, according to the present invention, the box-shaped mounting portion is larger in rigidity than the other portions. However, when an impact due to collision with a colliding object such as a pedestrian is applied to a vehicle is applied to the hood, then transmitted to the first wall, a force is concentratedly applied to the fracture portion arranged along the edges of the mounting portion, achieving immediate rupture of the fracture portion, resulting in sure alleviation of an impact to be applied to the colliding object.

Furthermore, according to the present invention, odor and hot air in the engine room can be restrained from intruding into the cowl portion through the mounting portion, and the mounting portion and the fixture are invisible in the portion exposed to the outside, resulting in enhancement in appearance. Moreover, the mounting portion can be arranged at the position away from the sealing member, resulting in enhancement in design flexibility.

Having described the present invention in connection with the illustrative embodiments, it is noted that the present invention is not limited thereto, and various changes and modifications can be made without departing from the scope of the present invention.

The entire teachings of Japanese Patent Application 2004-379372 filed Dec. 28, 2004 are hereby incorporated by reference.

What is claimed is:

1. A cowl top cover for an automotive vehicle having a body panel with a support plate, the body panel defining an engine room, a hood covering the engine room, and a cowl portion arranged behind the engine room, the cowl top cover comprising:
    a base having a mounting portion;
    a first wall extending from the base to the hood, the first wall supporting a sealing member abutting on the hood; and
    a second wall extending from the base and covering the cowl portion,
    wherein the base is supported by the support plate at the mounting portion and is exposed to the engine room, and
    wherein the mounting portion is covered with an upper plate spaced from the base.

2. The cowl top cover as claimed in claim 1, wherein the mounting portion comprises a base plate superimposed on the support plate, the base plate constituting a box with the upper plate, the box opening into the engine room.

3. The cowl top cover as claimed in claim 1, wherein the second wall is formed with an air intake which allows introduction of outside air into the cowl portion.

4. The cowl top cover as claimed in claim 1, further comprising ribs which connect the first wall and the second wall.

5. The cowl top cover as claimed in claim 2, wherein the upper plate faces the base plate and inclines from the second wall to the first wall in the direction away from the base plate.

6. The cowl top cover as claimed in claim 1, further comprising a fracture portion provided to a part of the first wall.

7. The cowl top cover as claimed in claim 6, wherein the fracture portion is arranged along engine room side edges of an opening of the mounting portion.

8. A cowl top covering system for an automotive vehicle having a body panel with a support plate, the body panel defining an engine room, a hood covering the engine room, and a cowl portion arranged behind the engine room, the system comprising:
    a base having a mounting portion;
    a first wall extending from the base to the hood, the first wall supporting a sealing member abutting on the hood;
    a second wall extending from the base and covering the cowl portion,
    wherein the base is supported by the support plate at the mounting portion and is exposed to the engine room, the mounting portion being covered with an upper plate spaced from the base;
    a rib which connects the first wall and the second wall;
    a fracture portion provided to at least one of the upper plate and the first wall; and
    a fixture which fixes the mounting portion to the body panel.

9. A mounting structure, comprising:
    a vehicle-body panel with a support panel, the support panel being arranged between an engine room and a cowl portion;
    a cowl top cover mounted to the vehicle-body panel, the cowl top cover comprising:
    a base having a mounting portion, the base being supported by the support plate;
    a first wall extending from the base to a hood covering the engine room, the first wall supporting a sealing member abutting on the hood;
    a second wall extending from the base and covering a cowl portion of a vehicle; and
    a fixture which fixes the mounting portion to the support portion,
    wherein portions of the base are covered by an upper plate spaced from the base and are exposed to the engine room.

10. The mounting structure as claimed in claim 9, wherein the fixture is constructed to hold the mounting portion and the support portion in a clamping manner.

* * * * *

UNITED STATES PATENT AND TRADEMARK OFFICE
CERTIFICATE OF CORRECTION

| | |
|---|---|
| PATENT NO. | : 7,316,448 B2 |
| APPLICATION NO. | : 11/188795 |
| DATED | : January 8, 2008 |
| INVENTOR(S) | : Motomu Koyama et al. |

Page 1 of 1

It is certified that error appears in the above-identified patent and that said Letters Patent is hereby corrected as shown below:

Title Page: item (30); please add;

Please include the below application as Foreign Application Priority Data in the above mentioned patent.

Japanese Application No. 2004-379372, filed December 28, 2004.

Signed and Sealed this

Sixth Day of May, 2008

JON W. DUDAS
*Director of the United States Patent and Trademark Office*